United States Patent
Selca et al.

(10) Patent No.: US 7,716,168 B2
(45) Date of Patent: May 11, 2010

(54) MODIFYING TABLE DEFINITIONS WITHIN A DATABASE APPLICATION

(75) Inventors: Vitore Selca, Seattle, WA (US); Christopher W. Bryant, Seattle, WA (US); Shane L. Groff, North Bend, WA (US); Theresa A. Naramore, Snohomish, WA (US); Tiginesh M. Beyene, Bellevue, WA (US); Clinton D. Covington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/169,856

(22) Filed: Jun. 29, 2005

(65) Prior Publication Data

US 2007/0005630 A1    Jan. 4, 2007

(51) Int. Cl.
   *G06F 17/30* (2006.01)
(52) U.S. Cl. .................... 707/102; 707/3; 707/101; 707/205
(58) Field of Classification Search ............... None
   See application file for complete search history.

(56) References Cited

U.S. PATENT DOCUMENTS

| | | | |
|---|---|---|---|
| 5,121,499 A | 6/1992 | McCaskill et al. | 715/503 |
| 5,175,810 A * | 12/1992 | Young et al. | 715/509 |
| 5,247,611 A | 9/1993 | Norden-Paul et al. | 707/504 |
| 5,255,356 A | 10/1993 | Michelman et al. | 707/504 |
| 5,319,777 A | 6/1994 | Perez | 395/600 |
| 5,359,729 A | 10/1994 | Yarnell et al. | 707/2 |
| 5,396,587 A | 3/1995 | Reed et al. | 707/503 |
| 5,418,898 A | 5/1995 | Zand et al. | 707/503 |
| 5,418,902 A | 5/1995 | West et al. | 707/503 |
| 5,455,853 A | 10/1995 | Cebulka et al. | |

(Continued)

FOREIGN PATENT DOCUMENTS

EP    1452981 A2    9/2004

(Continued)

OTHER PUBLICATIONS

Anonymous, "Method and Apparatus for Automatic Character Line Fill of Decimal Fields." IBM Technical Disclosure Bulletin vol. 36, No. 10, pp. 155-156, Oct. 1993.

(Continued)

*Primary Examiner*—Neveen Abel Jalil
*Assistant Examiner*—Bai D. Vu
(74) *Attorney, Agent, or Firm*—Merchant & Gould P.C.

(57) ABSTRACT

Methods, systems, and computer program products modify a table definition of a database table within a database application. A method involves providing a user interface for creating a new field in the database table, receiving data that creates the new field while displaying the database table, and modifying schema of the database table to include the new field and the data. The method also involves interpreting a data type of the data as the data is received. A data type interpreted for a column in the database table that contains the new field is the data type of the data received in the new field. Still further, the method involves handling objects dependent on the database table in a manner unbeknownst to a user of the database table. Thus, the schema is modified while the objects dependent on the database table remain visible or open to the user.

12 Claims, 13 Drawing Sheets

U.S. PATENT DOCUMENTS

| | | | |
|---|---|---|---|
| 5,471,575 A | 11/1995 | Giansante | 707/503 |
| 5,510,980 A | 4/1996 | Peters | 707/503 |
| 5,535,324 A | 7/1996 | Alvarez et al. | 707/503 |
| 5,553,215 A | 9/1996 | Kaethler | 707/503 |
| 5,598,519 A | 1/1997 | Narayanan | 707/504 |
| 5,600,584 A | 2/1997 | Schlafly | 707/504 |
| 5,604,854 A | 2/1997 | Glassey | 707/504 |
| 5,615,373 A | 3/1997 | Ho | |
| 5,649,192 A | 7/1997 | Stucky | |
| 5,685,001 A | 11/1997 | Capson et al. | 707/503 |
| 5,701,499 A | 12/1997 | Capson et al. | 707/503 |
| 5,708,827 A | 1/1998 | Kaneko et al. | 707/503 |
| 5,740,370 A | 4/1998 | Battersby et al. | |
| 5,752,253 A | 5/1998 | Geymond et al. | 707/503 |
| 5,758,337 A | 5/1998 | Hammond | |
| 5,768,158 A | 6/1998 | Adler et al. | 716/11 |
| 5,812,983 A | 9/1998 | Kumagai | 707/503 |
| 5,819,293 A | 10/1998 | Comer et al. | 707/503 |
| 5,838,965 A | 11/1998 | Kavanagh et al. | |
| 5,864,854 A | 1/1999 | Boyle | |
| 5,881,381 A | 3/1999 | Yamashita et al. | 707/503 |
| 5,890,174 A | 3/1999 | Khanna et al. | 707/504 |
| 5,893,920 A | 4/1999 | Shaheen et al. | |
| 5,913,033 A | 6/1999 | Grout | 709/219 |
| 5,920,725 A * | 7/1999 | Ma et al. | 717/171 |
| 5,926,822 A | 7/1999 | Garman | 707/504 |
| 5,944,789 A | 8/1999 | Tzelnic et al. | |
| 5,966,716 A | 10/1999 | Comer et al. | 707/203 |
| 5,987,481 A | 11/1999 | Michelman et al. | 707/503 |
| 6,021,413 A | 2/2000 | Vaduvur et al. | |
| 6,055,548 A | 4/2000 | Comer et al. | 707/538 |
| 6,055,549 A | 4/2000 | Takano | 707/503 |
| 6,070,177 A | 5/2000 | Kao et al. | |
| 6,112,214 A | 8/2000 | Graham et al. | 707/539 |
| 6,119,151 A | 9/2000 | Cantrell et al. | |
| 6,134,552 A | 10/2000 | Fritz et al. | 707/10 |
| 6,134,563 A | 10/2000 | Clancey et al. | 707/503 |
| 6,134,583 A | 10/2000 | Herriot | 709/217 |
| 6,138,130 A | 10/2000 | Adler et al. | 707/504 |
| 6,151,601 A | 11/2000 | Papierniak et al. | |
| 6,151,624 A | 11/2000 | Teare et al. | |
| 6,216,139 B1 | 4/2001 | Listou | 707/503 |
| 6,292,811 B1 | 9/2001 | Clancey et al. | 707/538 |
| 6,334,158 B1 | 12/2001 | Jenny et al. | 719/328 |
| 6,341,291 B1 | 1/2002 | Beatley et al. | |
| 6,374,268 B1 | 4/2002 | Testardi | |
| 6,477,527 B2 | 11/2002 | Carey et al. | 707/4 |
| 6,510,439 B1 | 1/2003 | Rangarajan et al. | |
| 6,542,933 B1 | 4/2003 | Durst, Jr. et al. | |
| 6,567,822 B1 | 5/2003 | Cudahy et al. | 707/104.1 |
| 6,631,519 B1 | 10/2003 | Nicholson et al. | |
| 6,640,234 B1 | 10/2003 | Coffen et al. | 707/538 |
| 6,694,321 B1 | 2/2004 | Berno | |
| 6,785,704 B1 | 8/2004 | McCanne | |
| 6,820,088 B1 | 11/2004 | Hind et al. | |
| 7,062,502 B1 | 6/2006 | Kesler | |
| 7,139,768 B1 | 11/2006 | Janzig et al. | |
| 7,174,327 B2 | 2/2007 | Chau et al. | 707/3 |
| 2002/0049764 A1 | 4/2002 | Boothby et al. | |
| 2002/0052769 A1 | 5/2002 | Navani et al. | |
| 2002/0063734 A1 | 5/2002 | Khalfay et al. | |
| 2002/0087729 A1* | 7/2002 | Edgar | 709/246 |
| 2003/0046366 A1 | 3/2003 | Pardikar et al. | |
| 2003/0145224 A1 | 7/2003 | Bailey | |
| 2003/0154191 A1* | 8/2003 | Fish et al. | 707/2 |
| 2003/0154197 A1* | 8/2003 | Millet et al. | 707/9 |
| 2003/0158947 A1 | 8/2003 | Bloch et al. | |
| 2003/0159089 A1* | 8/2003 | DiJoseph | 714/38 |
| 2003/0225758 A1* | 12/2003 | Yamasaki | 707/3 |
| 2004/0001106 A1 | 1/2004 | Deutscher et al. | |
| 2004/0039743 A1 | 2/2004 | Maleport et al. | |
| 2004/0103365 A1 | 5/2004 | Cox | |
| 2004/0133652 A1 | 7/2004 | Miloushev et al. | |
| 2004/0138815 A1 | 7/2004 | Li et al. | |
| 2004/0172424 A1 | 9/2004 | Edelstein et al. | 707/201 |
| 2004/0193969 A1 | 9/2004 | Nemoto et al. | |
| 2004/0236777 A1 | 11/2004 | Pardikar et al. | |
| 2005/0034064 A1 | 2/2005 | Meyers et al. | 715/513 |
| 2005/0069361 A1 | 3/2005 | Wang et al. | |
| 2005/0080823 A1 | 4/2005 | Collins | 707/200 |
| 2005/0091253 A1 | 4/2005 | Cragun et al. | 707/102 |
| 2005/0172261 A1 | 8/2005 | Yuknewicz et al. | 717/106 |
| 2005/0187897 A1 | 8/2005 | Pawar et al. | |
| 2005/0228990 A1 | 10/2005 | Kato et al. | |
| 2006/0004815 A1 | 1/2006 | Murata et al. | |
| 2006/0020586 A1 | 1/2006 | Prompt et al. | |
| 2006/0155705 A1 | 7/2006 | Kamper et al. | 707/8 |
| 2006/0168325 A1 | 7/2006 | Wood et al. | 709/238 |
| 2006/0168557 A1 | 7/2006 | Agrawal et al. | |
| 2006/0200499 A1 | 9/2006 | Bhatia et al. | |
| 2006/0242189 A1* | 10/2006 | Leetaru et al. | 707/102 |
| 2006/0259506 A1* | 11/2006 | Kim | 707/102 |
| 2007/0038702 A1 | 2/2007 | Taylor et al. | |
| 2007/0198657 A1 | 8/2007 | Saliba et al. | |

FOREIGN PATENT DOCUMENTS

| | | |
|---|---|---|
| WO | WO 00/60484 | 10/2000 |

OTHER PUBLICATIONS

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel-01.asp on Mar. 29, 2002, 6 pp.

Sonic.net. "Microsoft Excel 5.0 (Tips on Using MS Excel 5.0 Repeat Entries)" downloaded from www.sonic.net/.about.sbaumann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq..., downloaded May 16, 2006, 2 pp.

Khor, "Microsoft Office Excel 2003 Preview", Jun. 2003, http://msdn.microsoft.com/library/en-us/odc_xl2003_ta/html/odc_xlov.asp?frame=true, downloaded May 16, 2006, 19 pp.

U.S. Appl. No. 10/667,543, filed Sep. 22, 2003 entitled "Extension of Formulas and Formatting in an Electronic Spreadsheet".

U.S. Appl. No. 10/782,074, filed Feb. 19, 2004 entitled "Data Source Write back and Offline Data Editing and Storage in a Spreadsheet".

U.S. Appl. No. 11/317,648, filed Dec. 22, 2005 entitled "Data Source Task Pane".

U.S. Appl. No. 11/300,728, filed Dec. 15, 2005 entitled "Offline Multi-Table Data Editing and Storage System".

U.S. Appl. No. 11/231,260, filed Sep. 20, 2005 entitled "Templates in a Schema Editor".

Official Action in U.S. Appl. No. 10/667,543 mailed Feb. 15, 2006.

Official Action in U.S. Appl. No. 10/667,543 mailed Aug. 2, 2006.

U.S. Appl. No. 10/782,074, filed Feb. 19, 2004, entitled "Data Source Write Back and Offline Data Editing and Storage in a Spreadsheet".

Davidson, Louis, "Professional SQL Server 2000 Database Design," Wrox Press Ltd., 2001, 464 pp.

U.S. Official Action in U.S. Appl. No. 11/231,260, Selca et al., mailed Jul. 18, 2008.

U.S. Official Action in U.S. Appl. No. 11/343,957 mailed Jan. 15, 2008.

U.S. Official Action in U.S. Appl. No. 11/317,648 mailed Apr. 17, 2008.

U.S. Official Action mailed Oct. 16, 2007 in U.S. Appl. No. 11/231,260.

U.S. Official Action mailed Jan. 9, 2008 in U.S. Appl. No. 11/300,728.

PCT International Search Report in PCT/US2007/002662 mailed Jul. 5, 2007.

Davidson, "Professional SQL Server 2000 Database Design", Wrox Press Ltd., 2001, 464 pp.

"Mapping Windows XP Professional to Your Business Needs", Microsoft: Windows XP Resource Kits, http://www.microsoft.com/resources/documentation/Windows/XP/all/reskit/en-us/Default.asp?url=/resources/documentation/Windows/XP/all/reskit/en-us/prba_dwp_tnvo.asp, printed Dec. 15, 2005, 8 pp.

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

U.S. Official Action mailed Jan. 12, 2009 in U.S. Appl. No. 11/231,260.

EP Search Report in 07763001.0-2201/198439 mailed May 29, 2009.

U.S. Official Action mailed Jul. 31, 2009 in U.S. Appl. No. 11/231,260, pp. 1-23.

EP Examination Report in 07763001.0-2201/1984839 mailed Aug. 7, 2009, pp. 1-4.

U.S. Official Action mailed Sep. 25, 2009 in U.S. Appl. No. 11/231,260 (14917.0202USI), pp. 1-23.

Ganapathi, et al., "Why PCs Are Fragile and What We Can Do About It: A Study of Windows Registry Problems", Proceedings of the 2004 International Conference on Dependable Systems and Networks, 2004, 6 pp.

Carvey, "The Windows Registry as a Forensic Resource", Digital Investigation, 2005, pp. 201-205.

EP Summons to Attend Oral Hearing in 07763001.0-2201/1984839 mailed Oct. 29, 2009, pp. 1-9.

* cited by examiner

MODIFYING TABLE DEFINITIONS WITHIN A DATABASE APPLICATION

BACKGROUND

Creating and modifying tables utilizing a database application and a database core that stores user data can be an arbitrary endeavor. Users create tables and once a table is created, it's difficult to change or modify table schema in a way that is intuitive to users and is easy to use. Schema defines the table and schema modification options and/or dialog are so deeply rooted into a database application such that modifying the table requires a higher level of skill and core knowledge of database concepts in order to manipulate the database application. Thus, users who are not familiar with formal database theory, or who do not possess preconceived notions of what database design is, need help in determining and setting data types and other features based on their input data.

Previous database application versions only modify tables when a user is not viewing the data. Thus, a user of a previous version cannot use or operate a table and change the table at the same time. Also, in previous versions, data types of the data entered are guessed only after the user closes the table. And a user is prohibited from making changes to the structure of a table while a database object that depends on the table, such as a form or query, is open. Thus, in previous versions, in order to modify the schema of the table, data objects depending on the table have to be closed so that nothing else is using the table. For instance, when a user tries to modify a table while a dependent report is open, the user may receive an arbitrary notice to close the report and the table.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing methods, systems, and computer-readable mediums for modifying database table definitions. In general, the present invention allows users of a database application to change a table definition while the user is looking at the data. The present invention makes it easier than ever to modify database table definitions by adding new fields to a table or modifying the definition of fields in a table while browsing data. Embodiments of the present invention provide uniquely flexible and easy methods for working with table schema. The present invention includes a user-friendly method of adding a field to a table's schema and improved paste behavior for adding new fields. Some embodiments also include automatic, interactive data type guessing when a user types or pastes chunks of data into a new field or into a column that contains the new field and transparent handling of blocking dependencies from other database objects the user has open.

One embodiment is a method for modifying a table definition of a database table within a database application. The method involves providing a user interface for creating a new field in the database table, receiving data that creates the new field via the user interface while displaying the database table, and modifying schema of the database table to include the new field and the data. The method also involves interpreting a data type of the data as the data is received in the new field. A data type interpreted for a column in the database table that contains the new field is the data type of the data received in the new field. Still further, the method involves handling objects dependent on the database table in a manner unbeknownst to a user of the database table. Thus, the schema is modified while the objects dependent on the database table remain visible to the user.

Another embodiment is a computer program product including a computer-readable medium having control logic stored therein for causing a computer to modify a table definition of a database table within a database application. The control logic includes computer-readable program code for causing the computer to provide a user interface for creating a new field in the database table, receive data that creates the new field via the user interface while displaying the database table, and modify schema of the database table to include the new field and the data.

Still another embodiment is a computer-implemented system for modifying a table definition of a database table within a database application. The system includes a computing apparatus having a processor operative to provide a user interface for creating a new field in the database table, receive data that creates the new field via the user interface while displaying the database table, and modify schema of the database table to include the new field and the data. The processor may also be operative to interpret a data type of the data as the data is received in the new field and handle objects dependent on the database table in a manner unbeknownst to a user of the database table.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods, computer program products, and systems for modifying a table definition of a database table within a database application. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
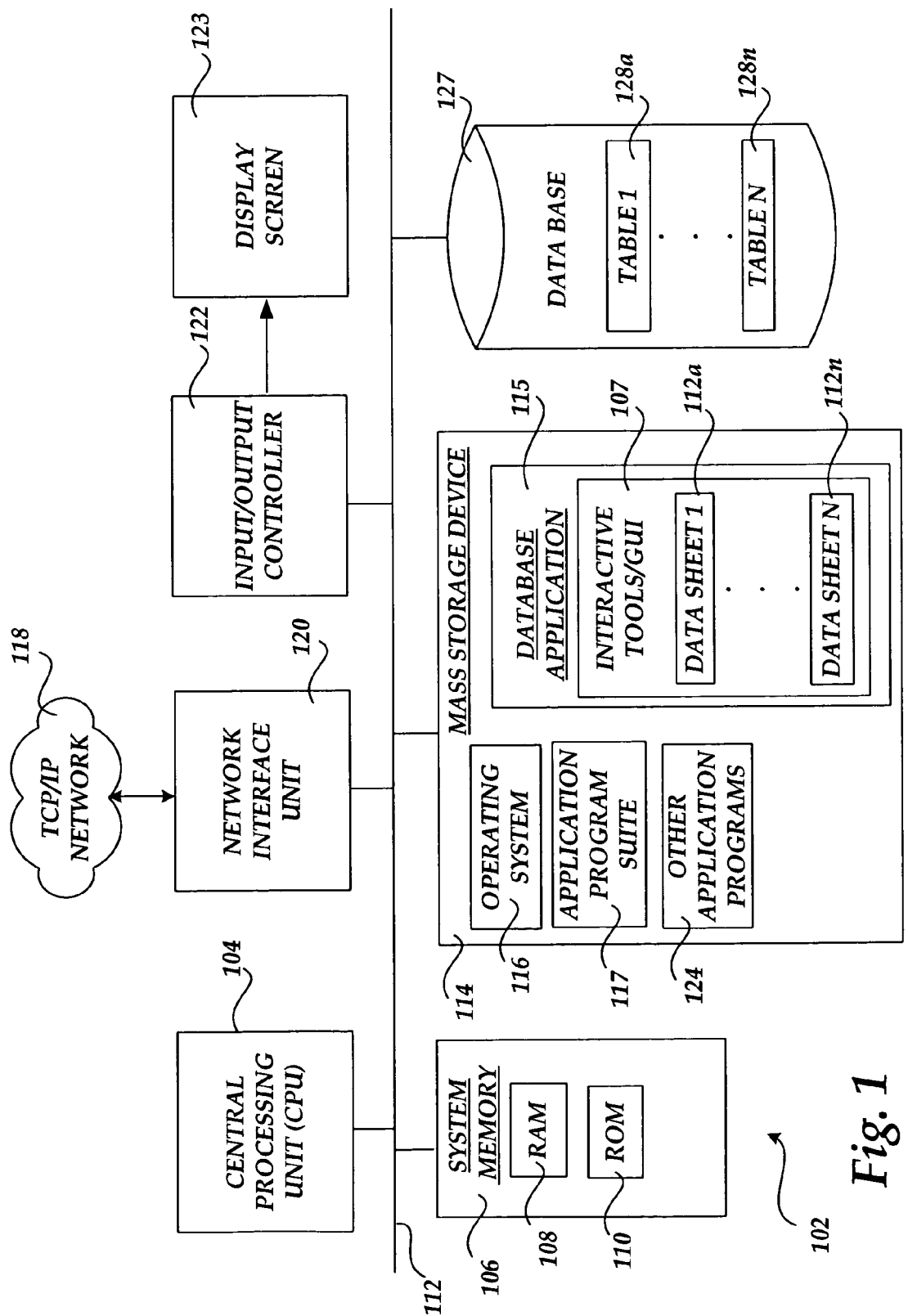
FIG. 1 is a block diagram illustrating the architecture of a personal computer utilized in an illustrative embodiment of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a block diagram illustrating the architecture of a personal computer 102 utilized in an illustrative embodiment of the present invention. The computer architecture shown in FIG. 1 illustrates a conventional personal computer, including a central processing unit 104 ("CPU"), a system memory 106, including a random access memory 108 ("RAM") and a read-only memory ("ROM") 110, and a system bus 112 that couples the memory to the CPU 104. A basic input/output system containing the basic routines that help to transfer information between elements within the computer, such as during startup, is stored in the ROM 110. The personal computer 102 further includes a mass storage device 114 for storing an operating system 116, application programs, such as a database application 115, and data. Data may also be stored in a separate database 127.

The mass storage device 114 is connected to the CPU 104 through a mass storage controller (not shown) connected to the bus 112. The mass storage device 114 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

"Computer storage medium" includes volatile and non-volatile, removable and non-removable storage medium implemented in any method or technology for storage of information such as computer readable instructions, data structures, program modules, or other data. Computer storage medium includes, but is not limited to, RAM, ROM, EEPROM, flash memory or other memory CD-ROM, digital versatile disks (DVD) or other optical storage, magnetic cassettes, magnetic tape, magnetic disk storage or other magnetic storage devices, or any other storage medium which can be used to store the desired information and which can be accessed by a computer.

According to various embodiments of the invention, the personal computer 102 may operate in a networked environment using logical connections to remote computers through a TCP/IP network 118, such as the Internet. The personal computer 102 may connect to the TCP/IP network 118 through a network interface unit 120 connected to the bus 112. It should be appreciated that the network interface unit 120 may also be utilized to connect to other types of networks and remote computer systems. The personal computer 102 may also include an input/output controller 122 for receiving and processing input from a number of devices, including a keyboard or mouse (not shown). Similarly, an input/output controller 122 may provide output to a display screen or unit 123, a printer, or other type of output device.

As mentioned briefly above, a number of program modules and data files may be stored in the mass storage device 114 and RAM 108 of the personal computer 102, including an operating system 116 suitable for controlling the operation of a networked personal computer, such as the WINDOWS operating systems from Microsoft Corporation of Redmond, Wash. The mass storage device 114 and RAM 108 may also store one or more application programs. In particular, the mass storage device 114 and RAM 108 may store the application program suite 117 for providing a variety of functionalities to a user. For instance, the application program 105 may comprise many types of programs such as a word processing application, a spreadsheet application, a desktop publishing application, and the like.

According to an embodiment of the present invention, the database application 115, such as ACCESS from Microsoft Corporation of Redmond, Wash., includes an interactive tool or graphical user interface module (UIM) 107. The UIM 107 is operative to modify a table definition of a database table, such as database tables 128a-128n, while displaying or rendering one or more corresponding datasheets with data, such as datasheets 112a-112n, to a user of the database application 115. The database application 115 may also be associated with the application program suite 117. The application program suite comprises a multiple functionality software application suite for providing functionality from a number of different software applications. An example of such a multiple functionality application suite 117 is OFFICE manufactured by Microsoft Corporation. Other application programs 124 illustrated in FIG. 1 may include an electronic mail application and a web browser, such as INTERNET EXPLORER from Microsoft Corporation. Additional details regarding modifying a table definition of a database table will be described below with respect to FIGS. 2-12.

Figure 2:
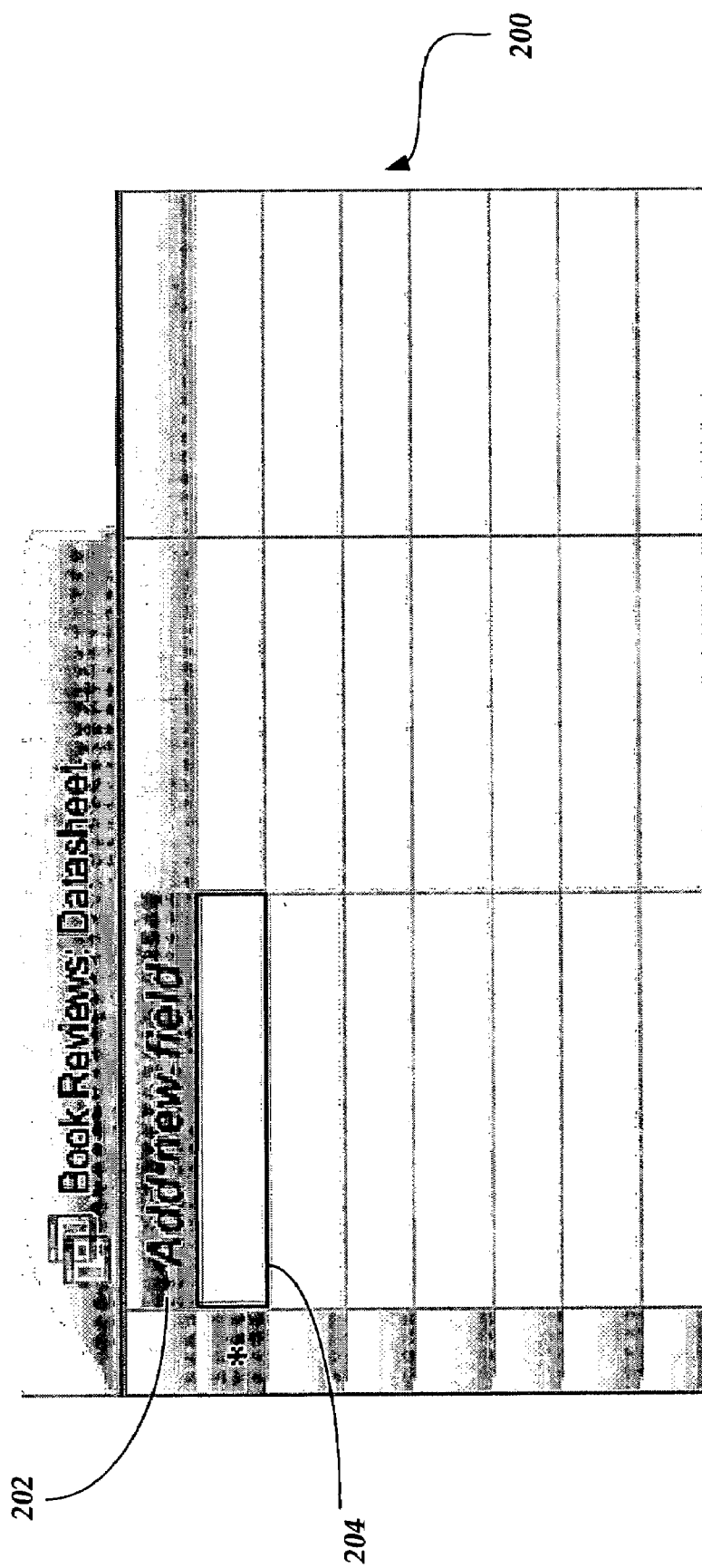
FIG. 2 is a computer screen display illustrating a user interface displaying a database table datasheet according to an illustrative embodiment of the present invention.

FIG. 2 is a computer screen display illustrating a user interface 200 displaying a database table datasheet, such as the datasheet 112a, according to an illustrative embodiment of the present invention. The user interface 200 presents a "datasheet view" of a table in the database application 115. A datasheet view is a spreadsheet-like view of a table and all of the table's data. The user interface 200 includes an "Add new field" column 202 in a blank table including a new field column cell 204. The "Add new field" column 202 is a new entry point for inserting a field in the table, for example the table 128a. The new field column cell 204 indicates to a user where to input data in order to add a new field to the column 202.

Figure 3:
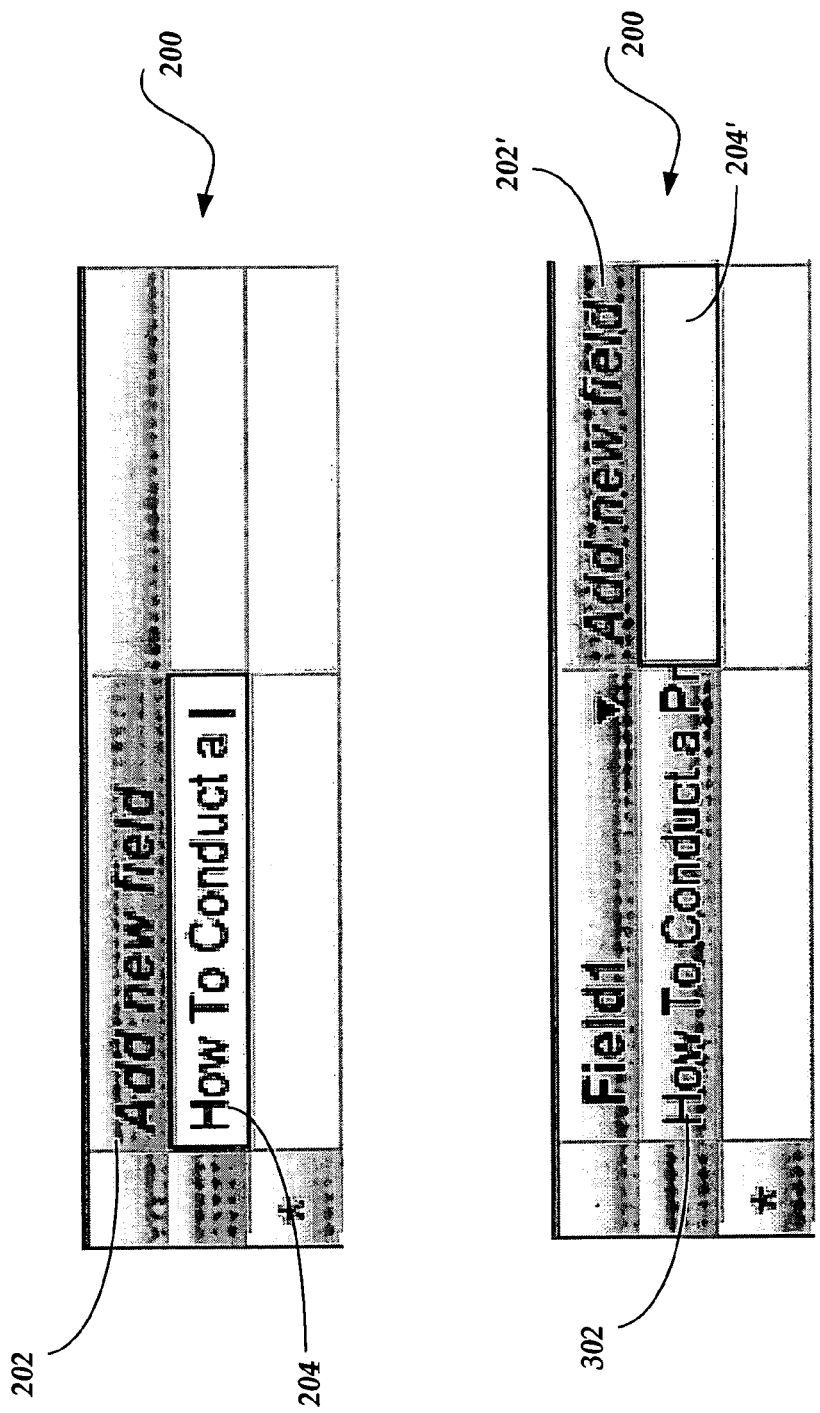
FIG. 3 is a computer screen display illustrating the user interface of FIG. 2 receiving data and creating a new field according to an illustrative embodiment of the present invention.

FIG. 3 is a computer screen display illustrating the user interface of FIG. 2 receiving data and creating a new field according to an illustrative embodiment of the present invention. As illustrated, the UIM 107 receives data via the user interface 200 in the new field cell 204 of the "Add new field" column 202. Thus, users of the database application 115 can create a new field by typing directly in the new field cell 204 in the "Add new field" column 202. Once the user commits and the UIM 107 receives the input data, the UIM 107 inserts a new field 302 and moves the "Add new field" column 202' and the new field cell 204' to different locations in the user interface 200.

Figure 4:
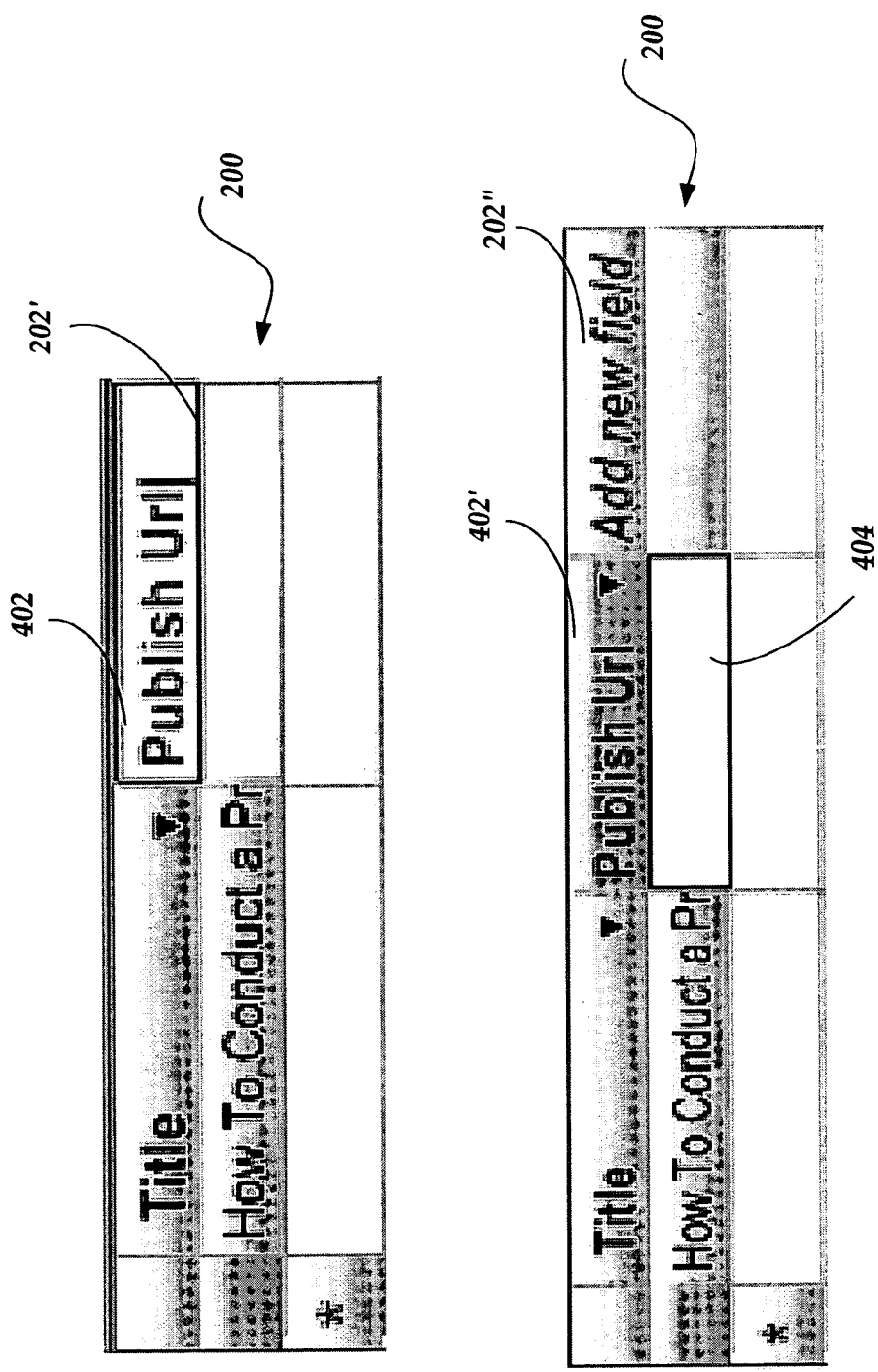
FIG. 4 is a computer screen display illustrating the user interface of FIG. 3 receiving data in a column header and inserting a new field according to an illustrative embodiment of the present invention.

FIG. 4 is a computer screen display illustrating the user interface 200 of FIG. 3 receiving data in a column header 402 of the "Add new field" column 202' and inserting a new field 402' according to an illustrative embodiment of the present invention. Once the user commits a change in the column header 402 and the UIM 107 receives the change, the UIM 107 inserts the new field 402' into the user interface 200 when the user types in the "Add New Field" column header 402. The UIM 107 then moves the "Add new field" column 202" to a different location in the user interface 200 although a user input focus 404 remains in the previous column 202'. Thus, users can create a new field by double-clicking in the header 402 of the "Add New Field" column 202' and typing the name of the column or field. New fields may also be inserted by pasting data into the "Add new field" column 202'. Additional details regarding pasting data to create new fields will be described below with respect to FIGS. 6-7.

Figure 5:
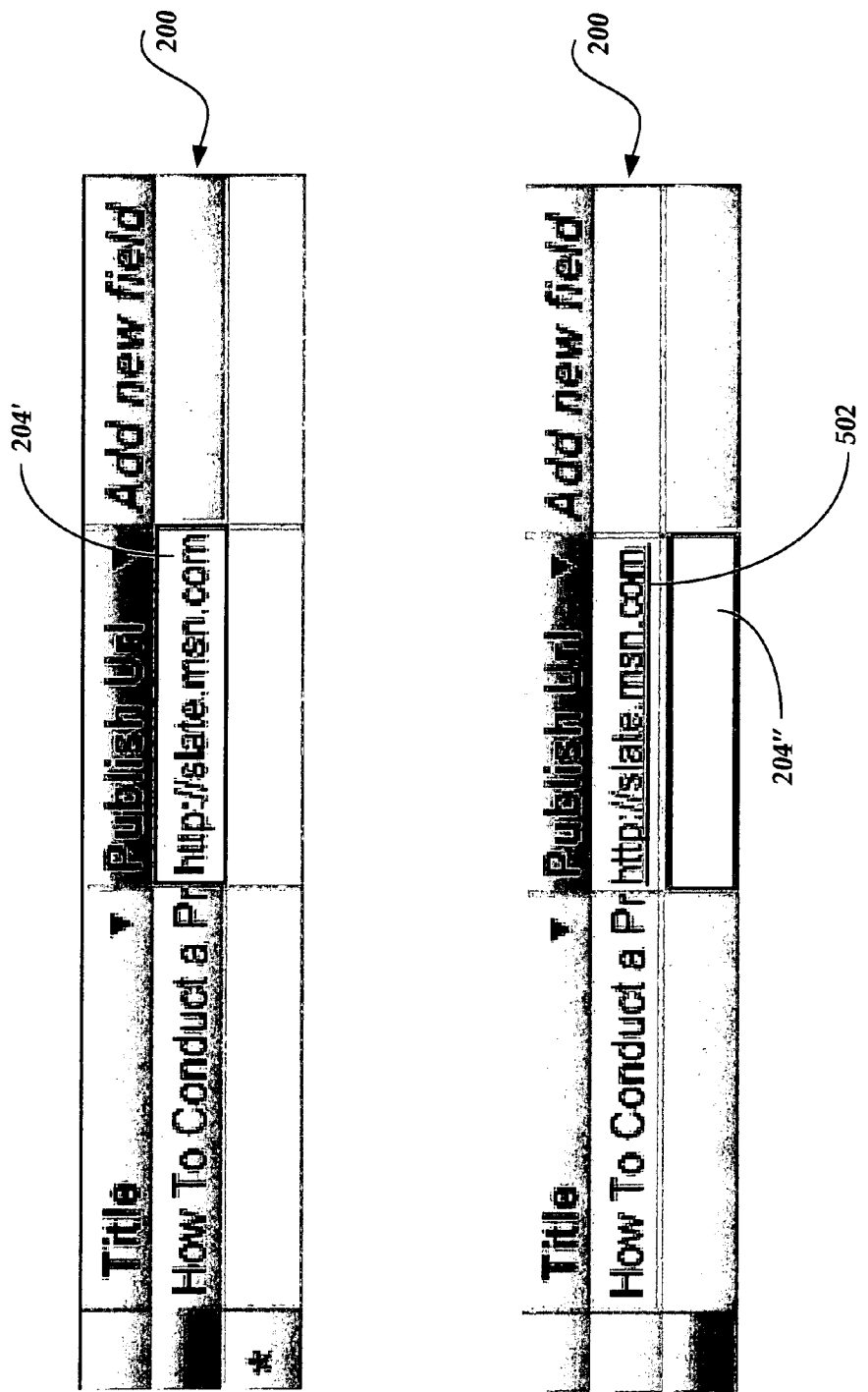
FIG. 5 is a computer screen display illustrating the user interface of FIG. 4 receiving data in a cell and detecting a data type according to an illustrative embodiment of the present invention.

FIG. 5 is a computer screen display illustrating the user interface 200 of FIG. 4 receiving data in the new field cell 204' and indicating detection of a data type according to an illustrative embodiment of the present invention. Once the user commits data to the new field cell 204' and the UIM 107 receives the data, the UIM 107 automatically detects a data type of the data received while the datasheet view remains visible to the user. The UIM 107 then moves the new field cell 204" to a different location. As illustrated, data type detection for a hyperlink 502 is apparent from the automatic underlining of the data received. This type of data type guessing or interpreting takes place for the first record the user enters in a new field while the table remains open and visible to the user. Therefore, the data type for an entire column can be interpreted by a first sample of data the user inputs into a new field after creating that field in datasheet view. Data types may also be interpreted for data that is pasted into one or more new fields. Additional details regarding interpreting data types for pasted data will be described below with respect to FIGS. 7-9.

Figure 6:
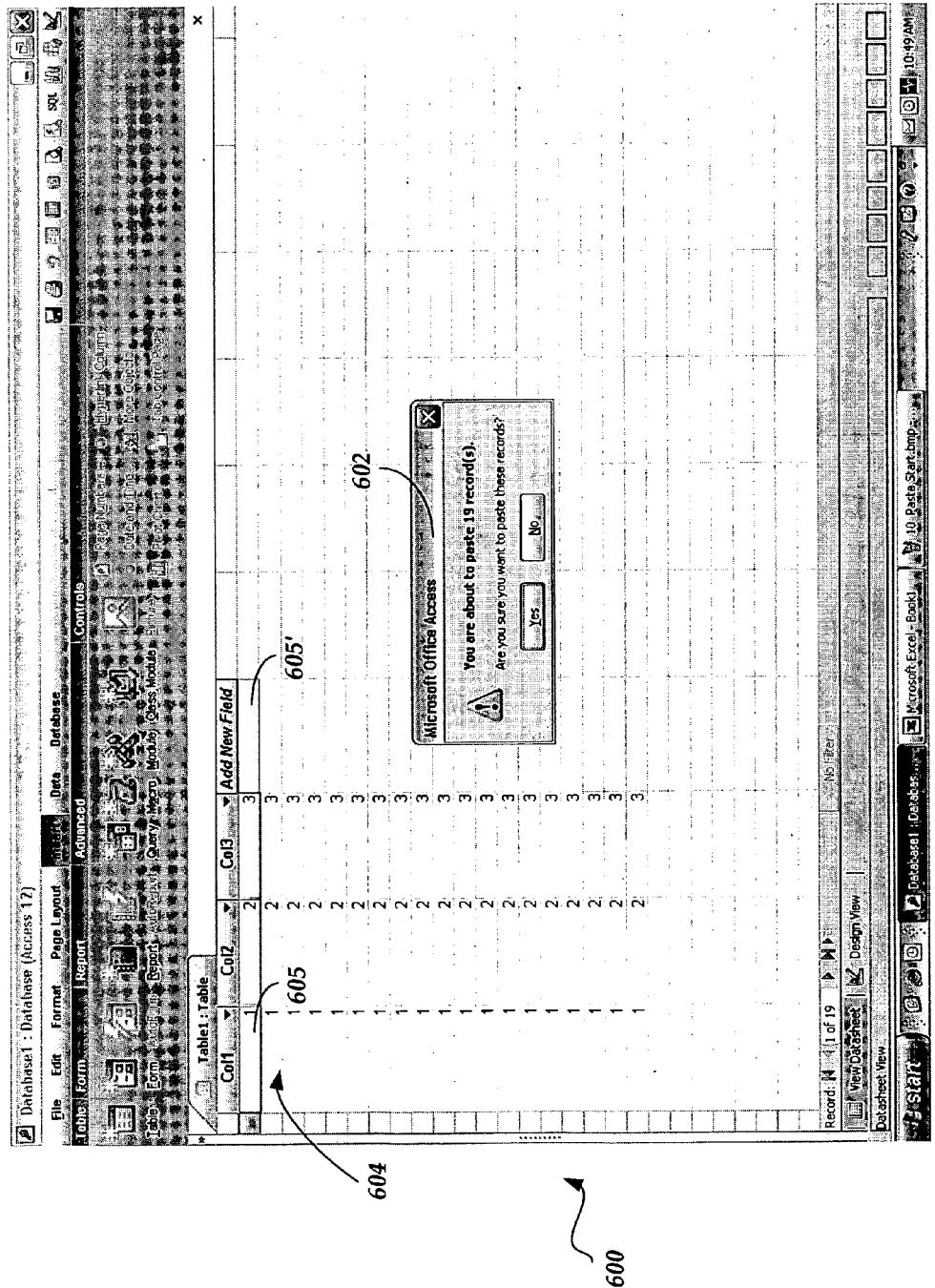
FIG. 6 is a computer screen display illustrating a user interface receiving data via a paste operation according to an illustrative embodiment of the present invention.

FIG. 6 is a computer screen display illustrating a user interface 600 operative to receive data via a paste operation according to an illustrative embodiment of the present invention. The UIM 107 renders the user interface 600 in response to receiving a paste command in an "Add new field" column 605. After receiving the paste command, the UIM 107 moves the "Add new field" column 605' to another location. The UIM 107 also renders the dialog 602 to acknowledge that multiple records are about to be pasted and awaits input as confirmation. Multiple new fields 604 are inserted in the table in response to receiving the paste command. Thus, users can create many new fields by pasting into the "Add New Field" column 605. Pasting tabular data results in multiple fields being added.

Figure 7:
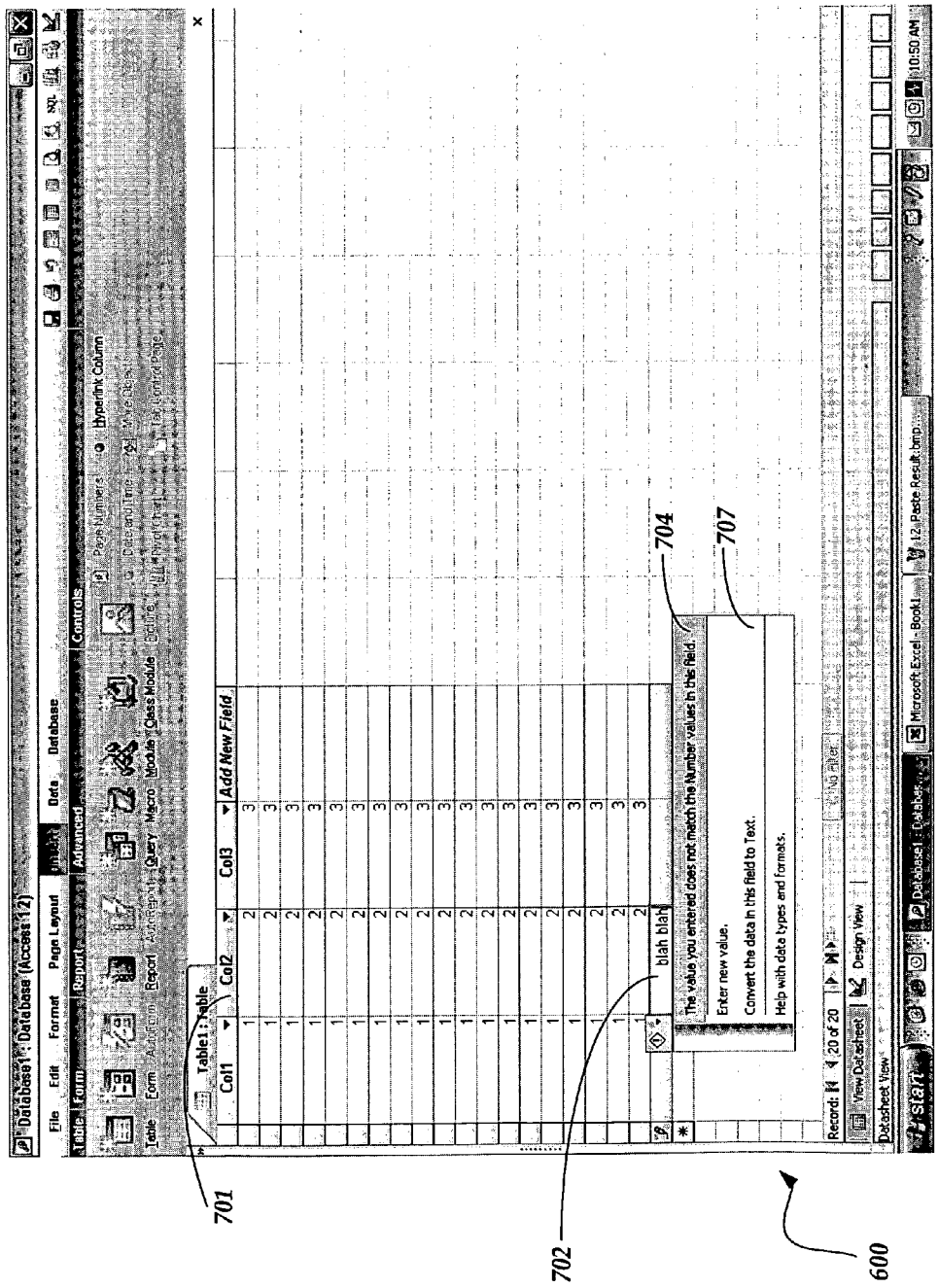
FIG. 7 is a computer screen display illustrating the user interface of FIG. 6 receiving data that conflicts with the data type interpreted for a new field column according to an illustrative embodiment of the present invention.

FIG. 7 is a computer screen display illustrating the user interface 600 of FIG. 6 receiving data 702 that conflicts with a data type interpreted for a new field column 701 according to an illustrative embodiment of the present invention. Once pasted data is received in the table, the UIM 107 interprets or guesses a data type of the data that is pasted into a new field. The UIM 107 examines all the data in the pasted range and determines the data type that best fits each column of data. In this case the data type may be currency or number. Paste differs from the data entry case in that the UIM 107 evaluates all of the values that are pasted, even if the number of records pasted is higher than a predetermined threshold. When the user pastes in a number of values for a field, the UIM 107 iterates through or examines the values and determines the data type for each individual value. Next, the UIM 107 applies the broadest data type that can store all of the values without loss or truncation of data or loss of precision.

Upon receiving the data 702 that conflicts with a currency or number data type, the UIM 107 renders a notice 704 indicating the entered data does not match the number values in the field or column 701. The UIM 107 also renders options 707 for resolving the conflict, such as entering a new value or converting the entire column or field 701 to text. Additional details regarding interpreting data types will be described below with respect to FIG. 9.

Figure 8:
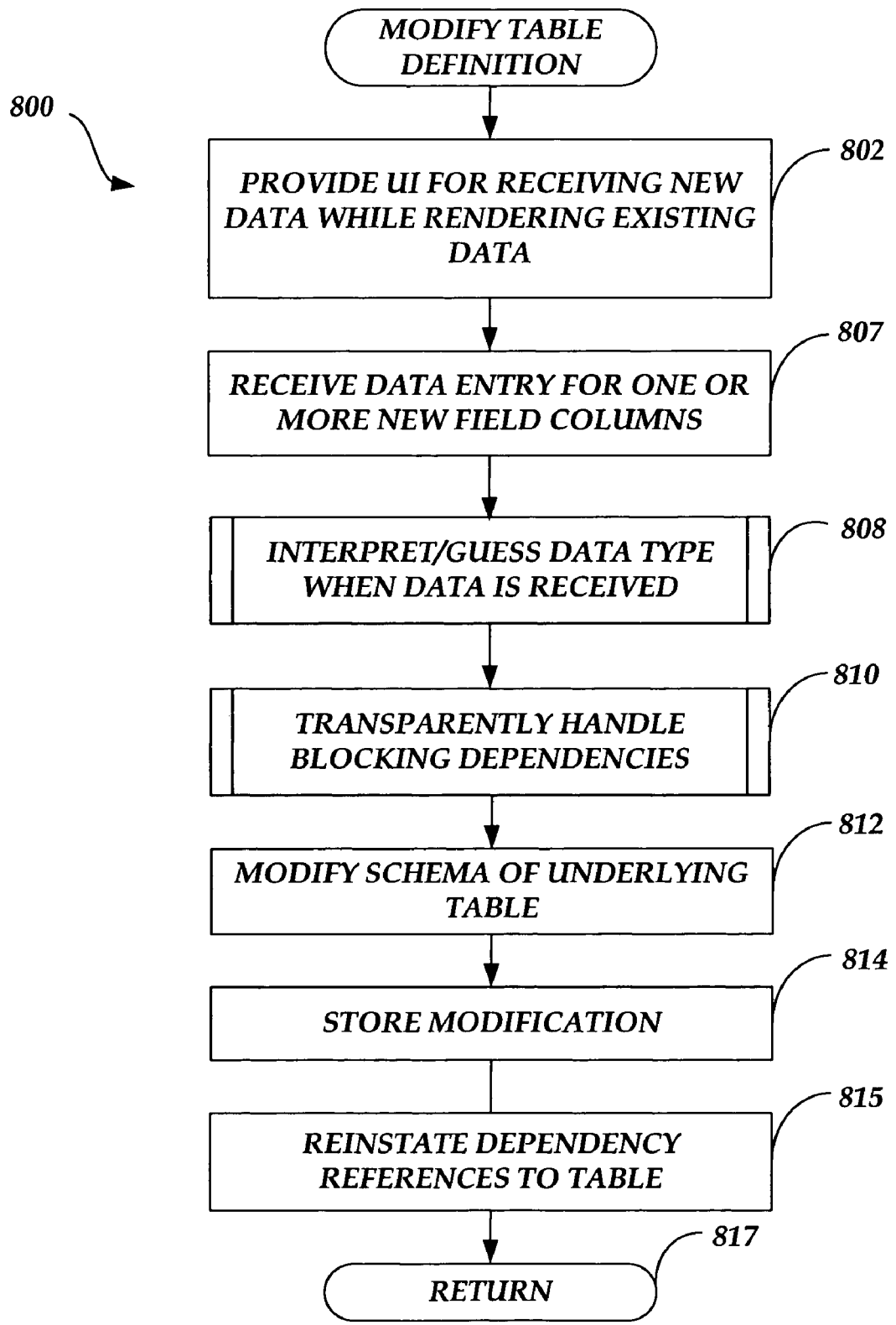
FIG. 8 is an illustrative operational flow performed in modifying a table definition of a database table within a database application according to an illustrative embodiment of the present invention.
Figure 9:
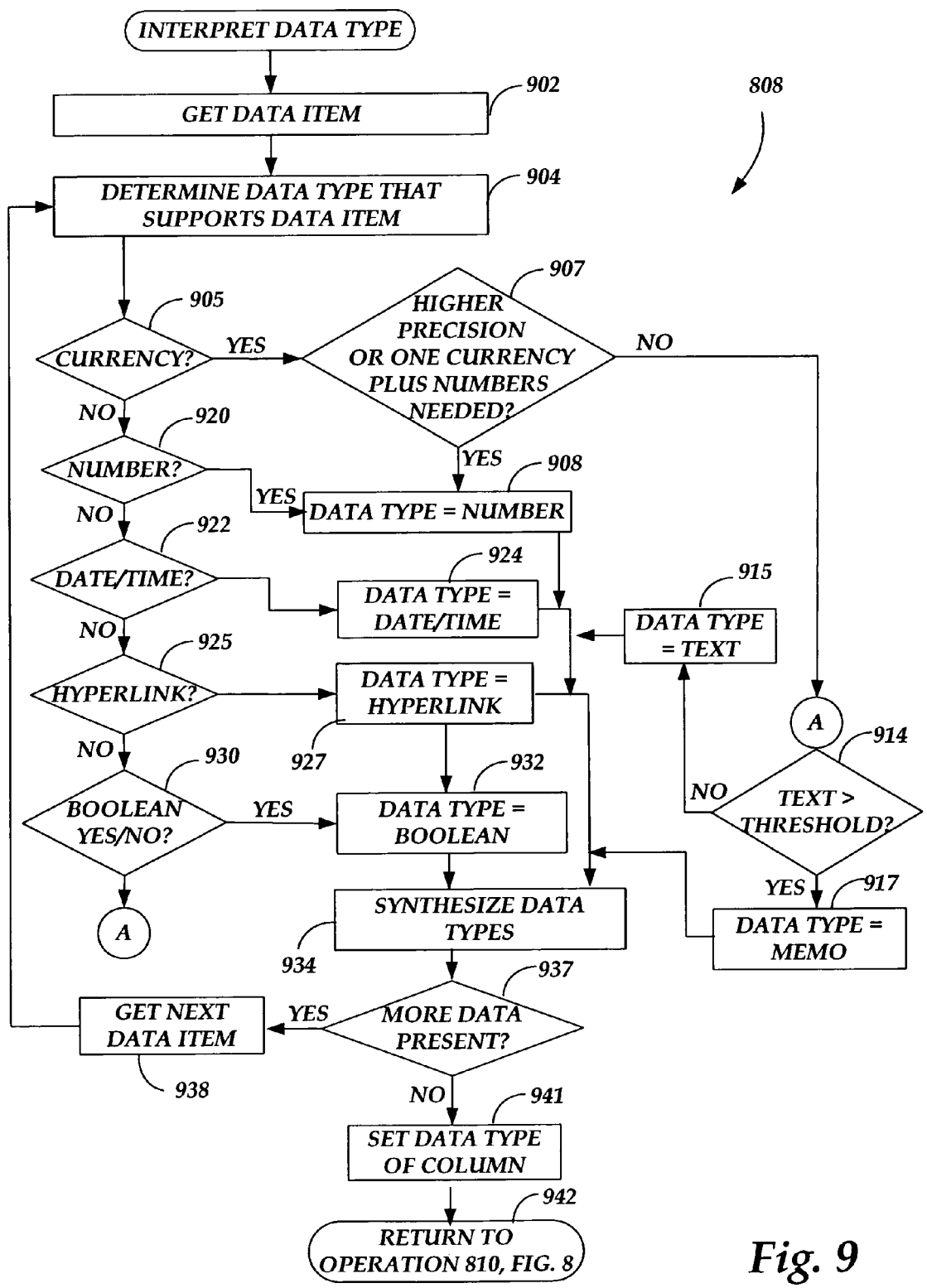
FIGS. 9-9a are illustrative operational flows performed in interpreting a data type of data received according to illustrative embodiments of the present invention.
Figure 10:
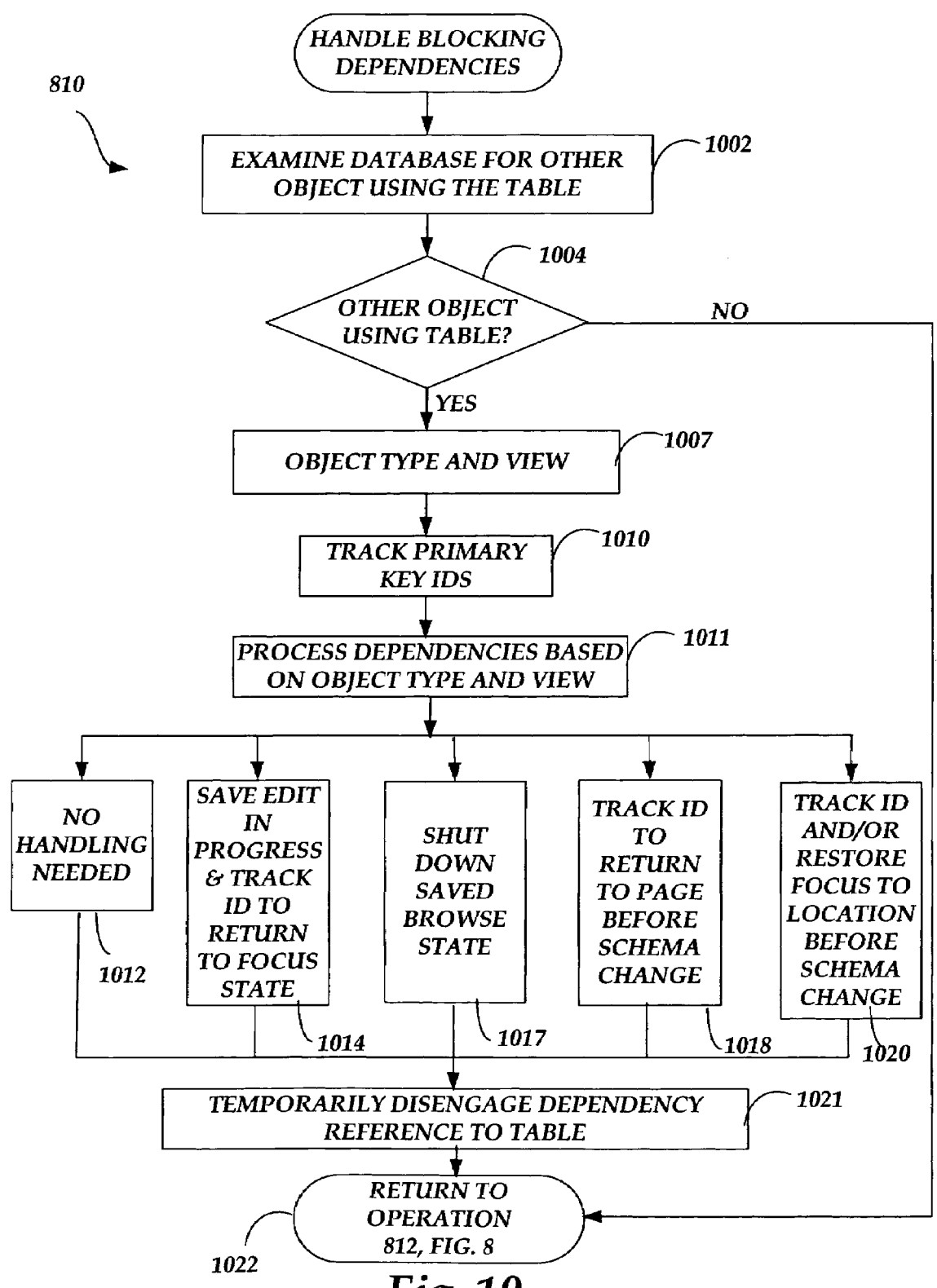
FIG. 10 is an illustrative operational flow performed in handling blocking dependencies according to an illustrative embodiment of the present invention.

FIGS. 8-10 are illustrative routines or operational flows performed in modifying a table definition of a database table within a database application according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 8-10, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 8 is an illustrative operational flow or routine performed in modifying a table definition of a database table according to illustrative embodiments of the present invention. The routine 800 begins at operation 802 where the UIM 107 provides a graphical user interface operative to receive new data while rendering or displaying existing data. The routine 800 then continues to operation 807.

At operation 807, the UIM 107 receives data entry for one or more new fields via user typing and/or a paste operation.

Next, the routine 800 continues to operation 808 where the UIM 107 interprets a data type of the data received as the data is received based on a first data entry or a paste operation. Additional details regarding interpreting a data type when the data is received is described below with respect to FIG. 9. The routine 800 then continues to operation 810.

At operation 810, the UIM 107 handles any blocking dependencies from objects, such as queries and dependent tables. The objects are handled based on their object type and their current view. Previously, dependent objects had to be closed to a user before table modifications could occur. However, in embodiments of the present invention, the UIM 107 handles blocking dependencies such that any handling is transparent to a user viewing the dependent objects and the datasheet view of the table. The UIM 107 temporarily closes dependency references to the database table without removing the objects from the view of a user. Additional details regarding transparently handling blocking dependencies will be described below with respect to FIG. 10. The routine 800 then continues to operation 812.

At operation 812, the UIM 107 modifies the schema of the underlying table in accordance with new field data entries. Then, at operation 814, the UIM 107 stores the modifications and continues to operation 815. At operation 815, the UIM 107 reinstates or restores dependency references to the database table that were temporarily closed at operation 810 described above. The routine 800 then returns control to other routines at return operation 817.

FIG. 9 is an illustrative operational flow performed in interpreting a data type of data received according to an illustrative embodiment of the present invention. The routine 808 begins at operation 902 where the UIM 107 gets and examines a data item received. Next at operation 904, the UIM 107 determines a data type that supports the data item by continuing to operation 905.

At operation 905, the UIM detects whether the data item is potentially a currency value. When the data items could be currency, the routine 800 continues to operation 907. At operation 907 a determination is made as to whether higher precision is needed or whether only one currency symbol (e.g. '$') exist with numbers. For example, when one or more values that appear to be currency values (e.g. $1.23), are followed by a numeric value (e.g. 1.23456789), higher precision is needed because both numbers cannot be accurately represented using a currency data type. Thus in this case, the data type is interpreted as number with loading point double precision (double) instead of currency. Similarly, when one or more values appear to be integers (e.g. 37, 498), but a value cannot be represented as an integer (e.g. 4.5), the data type is interpreted as number (double) instead of number (integer).

Thus, when higher precision is needed or only one currency symbol is present, the routine 808 continues from operation 907 to operation 908 where the UIM 107 sets the data type to number. Because there is only one type of currency symbol mixed in with numbers, the symbol can be removed from the value. Number data types facilitate improved filtering, aggregation, and other features that a text data type would not. When a user desires a currency format can be applied separately to convert the number field to a currency data type. The routine 808 then continues to operation 934 described below.

When at operation 907, higher precision is not needed or multiple symbols or currency types are present, the routine 808 continues from operation 907 to operation 914. At operation 914, the UIM 107 detects whether the number of characters present in a data item is greater than a predetermined threshold, for example 255 characters. When the number of characters is less than the threshold, the routine 808 continues to operation 915 where the UIM 107 sets the data type to text. The routine 808 then continues to operation 934 described below.

When at operation 914, the number of characters is not less than the threshold, the routine 808 continues to operation 917 where the UIM 107 sets the data type to memo. The routine 808 then continues to operation 934 described below.

At operation 905, when no currency symbols are present, the routine 808 continues to operation 920 where the UIM 107 detects whether only numbers are present. When only numbers are present the routine 808 continues to operation 908 described above. When only numbers are not present, the routine 808 continues from operation 920 to operation 922.

At operation 922, the UIM 107 detects whether the data includes date and/or time content. When the data includes date and/or time information the routine 808 continues to operation 924 where the UIM 107 sets the data type to date/time and applies a general date format. The routine 808 then continues to operation 934 described below.

When at operation 922, the UIM 107 detects not only date and/or time information is present, the routine 808 continues to operation 925. At operation 925, the UIM 107 detects whether the data forms a hyperlink. When the data forms a hyperlink, the routine 808 continues to operation 927 where the UIM 107 sets the data type to hyperlink. The routine 808 then continues to operation 934 described below.

When at operation 925, the UIM 107 detects that the data does not form a hyperlink, the routine 808 continues to operation 930. At operation 930, the UIM 107 detects whether data forms a Boolean value, such as yes or no. When the data forms a Boolean value, the routine 808 continues to operation 932 where the UIM 107 sets the data type to Boolean. The routine 808 then continues to operation 934 described below. When at operation 930, the UIM 107 detects that the data does not form a Boolean value, the routine 808 continues to operation 914 described above.

At operation 934, the UIM 107 synthesizes the data types for the current data item with the previous data item if a previous data item is present. Thus, for example if a number (double) data type is detected after an integer data type, the UIM 107 synthesizes the data type to number (double). Next at operation 937, the UIM 107 determines whether more data is present. When more data is present, the routine 808 continues from operation 937 to operation 938, where the UIM 107 gets the next data item. The routine 808 then continues to operation 904 described above.

When more data is not present at operation 937, the routine 808 continues from operation 937 to operation 941. At operation 941, the UIM 107 sets the data type of the column to the synthesized data type. The routine 808 returns control to routine 800, operation 810 at return operation 942.

Figure 9A:
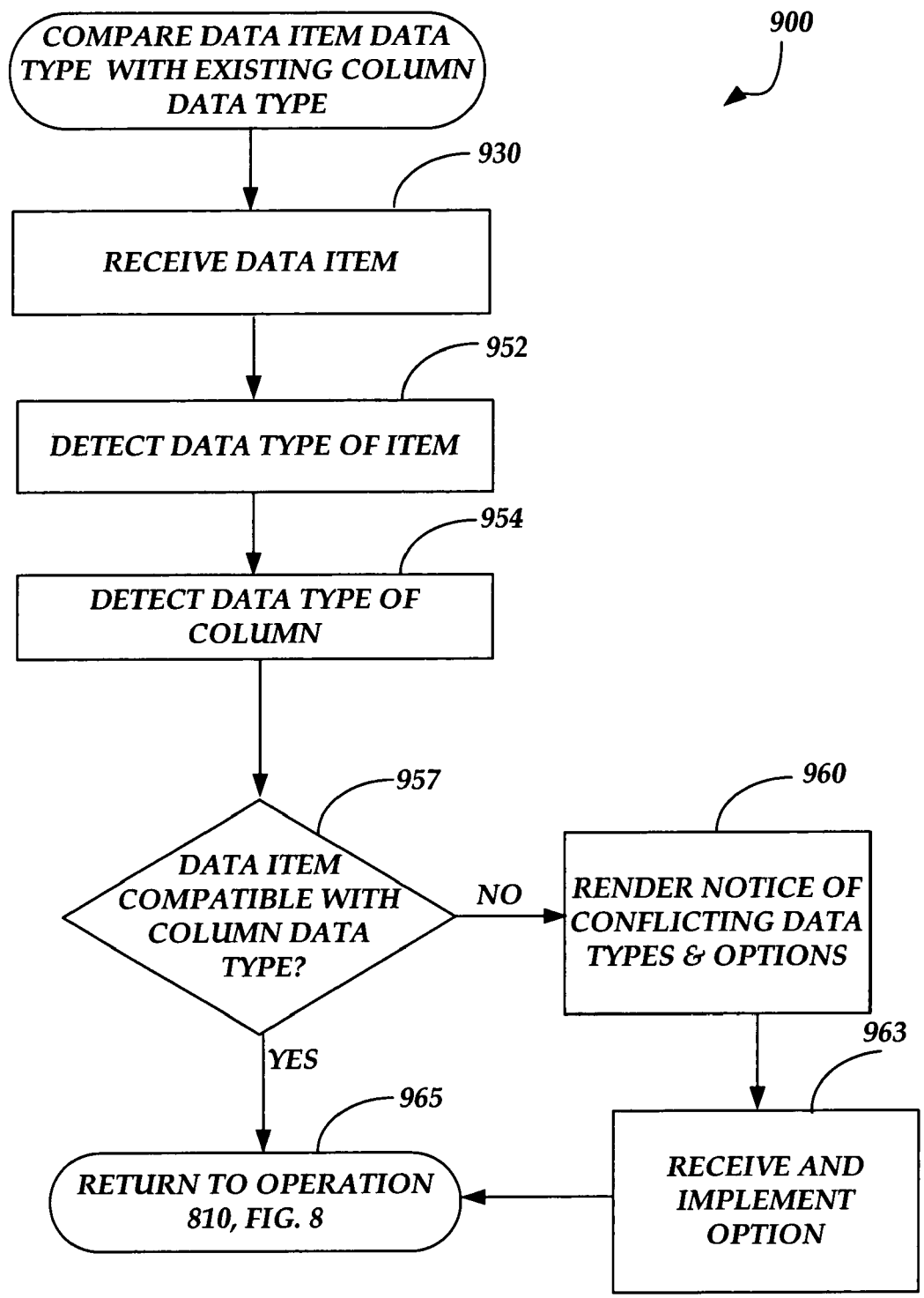

In another embodiment of the present invention, when data is received in a column that has already been assigned a data type, as illustrated in FIG. 7, the UIM 107 compares the data type of the data item received to the column data type for compatibility. Referring now to FIG. 9a, a routine 900 for comparing column data type to new data item data types will be described. The routine 900 begins at operation 930 where the data item is received. Next, at operation 952, the UIM 107 detects the data type of the received data item.

Then at operation 954, the UIM 107 detects a data type of the column receiving the data. The routine 900 then continues to operation 957. At operation 957, the UIM 107 detects whether the data type of the data received is compatible with or matches the data type of the column. When the data types are compatible, the routine 900 returns control to routine 800, operation 810 at return operation 965.

At operation 957 when the data types are not compatible, the routine 900 continues to operation 960. At operation 960, the UIM 107 renders or displays a notice of conflicting data types and options for resolving the conflict. The options may include entering another value or converting the data type to text. The routine 900 then continues to operation 963.

At operation 963, the UIM 107 receives and implements the option selected by a user. The routine 900 then returns control to other routines at return operation 965 described above.

FIG. 10 is an illustrative operational flow performed in handling blocking dependencies according to an illustrative embodiment of the present invention. The UIM 107 handles one or more objects dependent on the database table in a manner unbeknownst to a user of the database table. Thus, the UIM 107 modifies the schema of the database table while the objects dependent on the database table remain visible to the user. This allows changes to a table's schema while dependent views are available or open. The routine 810 begins at operation 1002 where the UIM 107 examines the database for objects currently utilizing the table that is receiving new data.

Next, at operation 1004, the UIM 107 detects whether there are any other objects utilizing the database table. When no objects are using the table, the routine 810 returns control to routine 800, operation 812 at return operation 1022. When one or more objects are dependent on the table, the routine 810 continues to operation 1007.

At operation 1007, the UIM 107 detects an object type and a view of each object utilizing the database table. It should be appreciated that the object types may include the following: another table having a lookup query to the database table, a query, a form having a record source that depends on the database table, and/or a report. It should also be appreciated that the various object views may include the following: a design view, a datasheet view, a form view, a report view, a print preview view, and/or a chart or pivot view.

Next, the routine 810 continues from operation 1007 to operation 1010. At operation 1010, the UIM 107 tracks a primary key identifier for each row being modified in the database table. Additional details regarding a primary key will be described below with respect to FIGS. 11-12.

Figure 11:
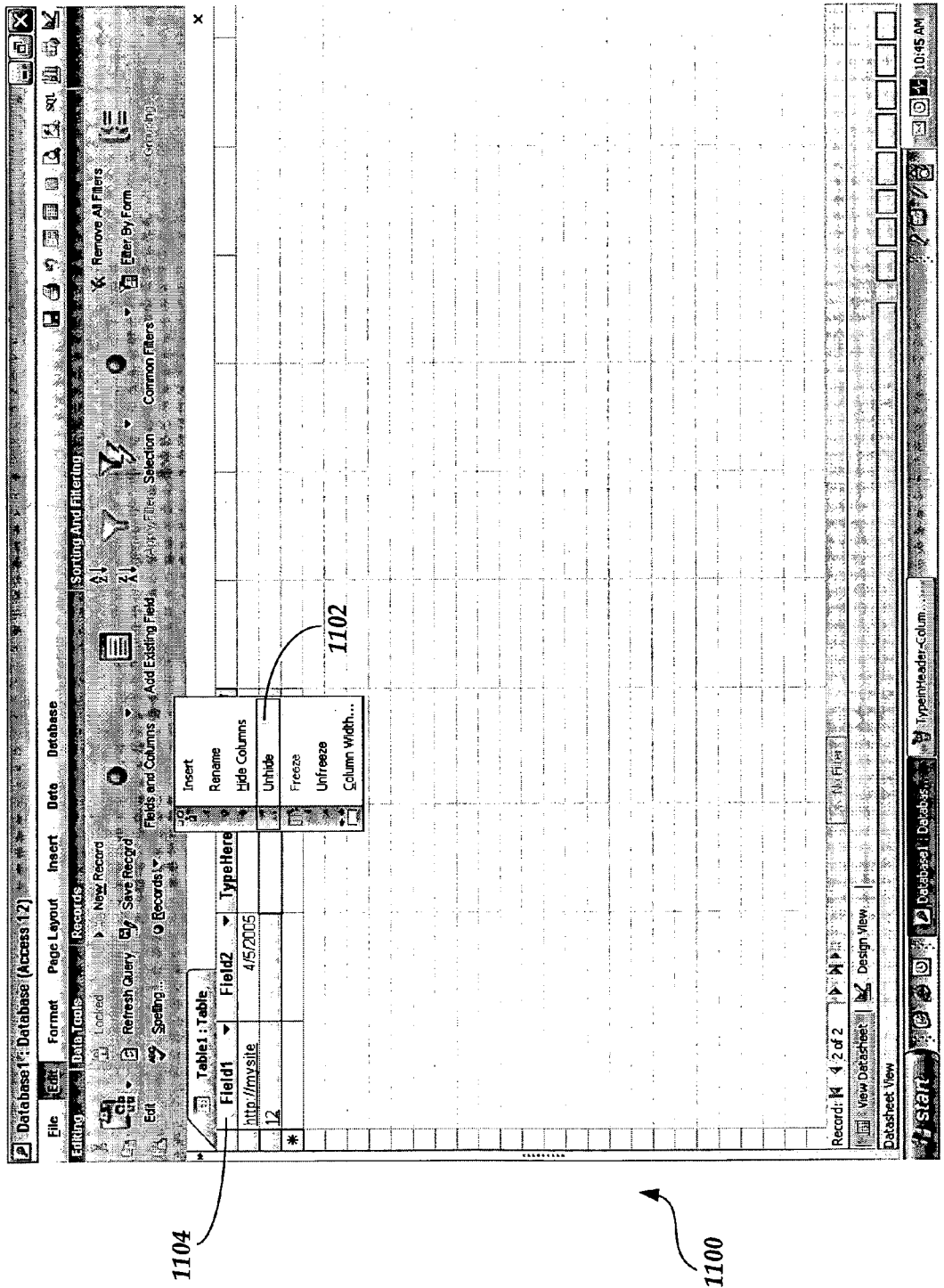
FIG. 11 is a computer screen display illustrating user interface displaying an unhide command according to an illustrative embodiment of the present invention.
Figure 12:
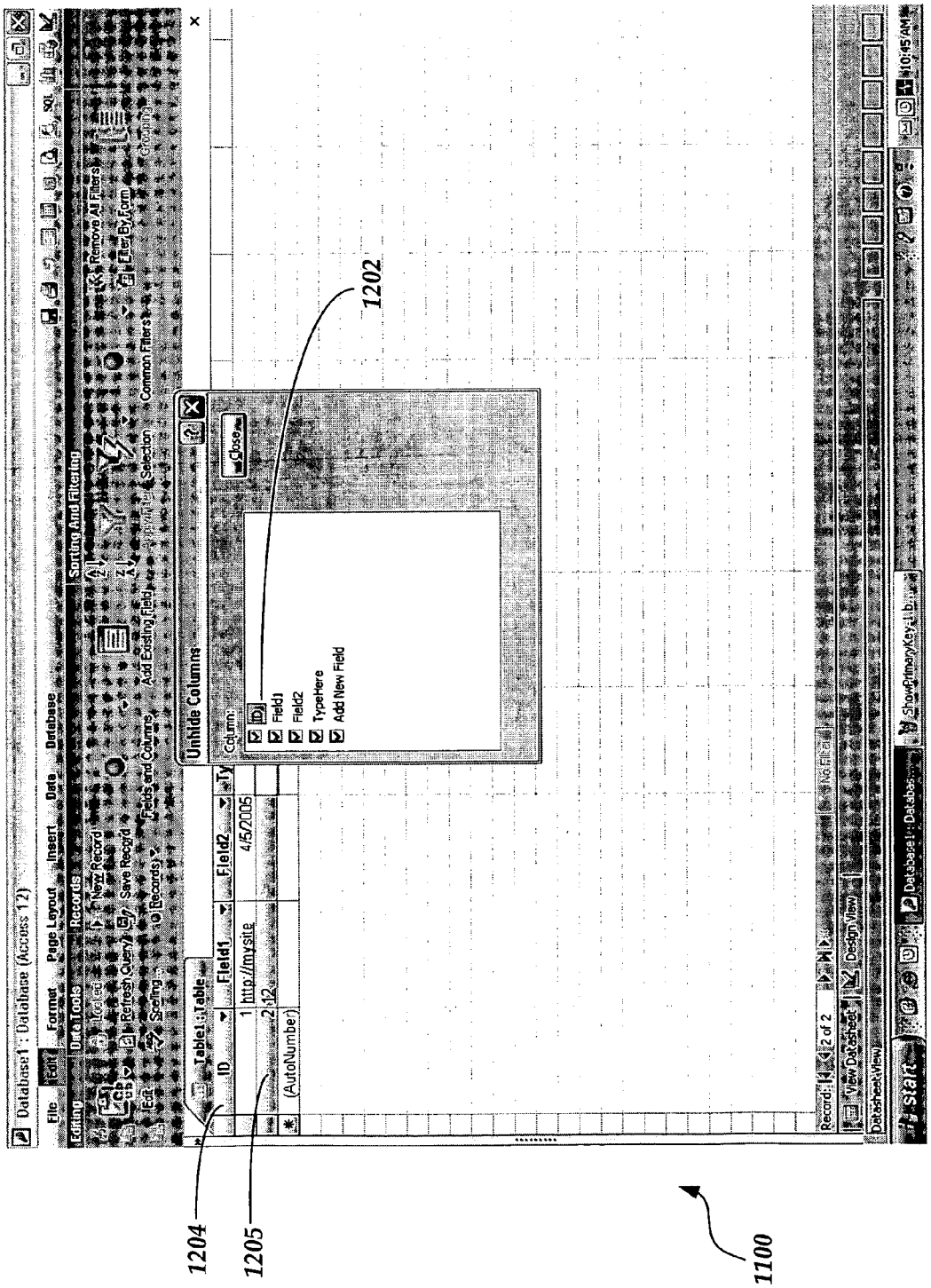
FIG. 12 is a computer screen display illustrating the user interface of FIG. 11 displaying a primary key column according to an illustrative embodiment of the present invention.

Referring now to FIGS. 11-12, a computer screen display illustrating a user interface 1100 displaying an unhide command 1102 for a primary key and a primary key column 1204 according to an illustrative embodiment of the present invention will be described. A primary key is a hidden column that has a unique identifier for each row, such as row 1104, in the database table. A user may view the primary key by selecting the unhide command 1102 as illustrated in FIG. 11.

Referring to FIG. 12, a selection of the ID unhide command 1202 reveals the ID column 1204 as the primary key. Thus, every row on the table has a unique value or ID, such as ID 1205, in the primary key 1204. The UIM 107 uses the primary key to track which row is being modified. For instance, behind the scenes when the UIM 107 makes a schema change to the table, the UIM 107, transparent to the user, closes the table that an object is using in order to gain exclusive access for a schema change. Subsequent to making the schema change, the UIM 107 reopens the table and returns to the editing location identified prior to the schema change. Thus, the UIM 107 restores or returns to the editing user interface by tracking the primary key unique identifier for the row receiving an edit just prior to the schema change.

Returning to FIG. 10, the routine 810 continues from operation 1010 to operation 1011 where the UIM 107 processes the blocking dependencies based on object type and view according to the following table and legend:

TABLE 1

Dependency Handling

| OBJECT | VIEW | | | | | |
|--------|------|------|------|--------|---------------|-------------|
|        | Design | Datasheet | Form | Report | Print preview | Chart/Pivot |
| Table  | 0 | 1 | 0 | 0 | 2 | 3 |
| Query  | 0 | 1 | 0 | 0 | 2 | 3 |
| Form   | 4 | 1 | 1 | 0 | 2 | 3 |
| Report | 4 | 0 | 0 | 5 | 2 | 0 |

Legend
0. No Handling Required;
1. Save any edit in progress and track the primary key to return to the focus state rendered prior to modifying the schema after the schema is modified;
2. Track the primary key to return to the page rendered just before modifying the schema after the schema is modified;
3. Track the primary key to return to the focus state rendered just before modifying the schema after the schema is modified;
4. Close a saved browse state rendered prior to modifying the schema; and
5. Return focus to the location before the schema change.

Next, based on the object type and view of the dependency object(s), the routine 810 continues from operation 1011 to operations 1012, 1014, 1017, 1018, and/or 1020. Thus, according to Table 1, when the view is set to print preview view and the object type is table, query, report or form, the routine 810 continues from operation 1011 to operation 1018 where the UIM 107 executes according to legend number 2 described above.

Similarly, when the view is set to chart view or pivot view and the object type is table, query, or form, the routine 810 continues from operation 1011 to operation 1020, where the UIM 107 executes according to legend number 3 described above.

Still further, when the view is set to datasheet view and the object type is table, query, or form, or when the view is set to form and the object type is form, the routine 810 continues from operation 1011 to operation 1014 where the UIM 107 executes according to legend number 1 described above.

Also, when the view is set to design and the object type is set to form or report, the routine 810 continues from operation 1011 to operation 1017, where the UIM 107 executes according to legend number 4 described above.

Similarly, when the view is set to report view and the object type is report, the routine 810 continues from operation 1011 to operation 1020 where the UIM 107 executes according to legend number 5 described above except the primary key may not be tracked depending on how the report data is generated.

Next, the routine 810 continues to operation 1021 where the UIM 107 temporarily disengages any dependency reference from the table while maintaining availability or visibility of the dependency object. The routine 810 then continues to return operation 1022 described above.

Based on the foregoing, it should be appreciated that the various embodiments of the invention include methods, systems, and computer-readable mediums for modifying a table definition of a database table within a database application. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for modifying a table definition of a database table within a database application, the method comprising:
    at a computer, providing a user interface for creating a new field in the database table, wherein the user interface is illustrated by a computer screen;
    receiving a paste command in a database table column and pasting tabular data in a plurality of cells in the database table to insert multiple new fields in the database table column via the user interface while rendering the database table;
    modifying a schema of the database table to include each new field of the inserted multiple new fields and the tabular data; and
    interpreting a data type of the tabular data that is pasted in the database table column to insert the multiple new fields, wherein interpreting a data type of the tabular data comprises:
        examining all of a plurality of data values in a range comprising the pasted tabular data, wherein a number of records comprising the pasted tabular data is higher than a predetermined threshold;
        determining a data type from among a plurality of data types for each individual data value in the range comprising the pasted tabular data, wherein determining the data type comprises:
            determining whether the pasted tabular data includes a currency;
            in response to the pasted tabular data including the currency,
        determining whether a higher precision or the currency plus numbers are required;
            in response to the higher precision or the currency plus numbers being required, setting the data type as a number data type;
            in response to the higher precision or the currency plus numbers not being required, determining whether the pasted tabular data includes multiple currencies or a mixed data type;
            in response to the pasted tabular data not including the multiple currencies or the mixed data type, setting the data type as a currency data type;
            in response to the pasted tabular data including the multiple currencies or the mixed data type, determining whether any cell containing the pasted tabular data contains text that exceeds a threshold number of characters;
            in response to the text exceeding the threshold number of characters, setting the data type as a memo data type;
            in response to the text not exceeding the threshold number of characters, setting the data type as a text data type;
            determining whether the pasted tabular data includes numbers;
            in response to the pasted tabular data including numbers, setting the data type as a number data type;
            determining whether the pasted tabular data includes at least one of a date or time;
            in response to the pasted tabular data including at least one of a date or time, setting the data type as at least one of a date or time data type;
            determining whether the pasted tabular data includes a hyperlink;
            in response to the pasted tabular data including the hyperlink, setting the data type as a hyperlink data type;
            determining whether the pasted tabular data includes Boolean values;
            in response to the pasted tabular data including the Boolean values, setting the data type as a Boolean data type; and
        applying a broadest of the plurality of data types that can store all of the plurality of data values without at least one of loss of data, truncation of data, and loss of precision.

2. The method of claim 1, further comprising:
    receiving data in a cell of the column in the database table containing the new fields;
    in response to the data in the cell not being of a same data type as interpreted for the column, rendering a dialog providing notice that the data in the cell is not of the same data type interpreted for the column and presenting resolution options; and
    in response to rendering the dialog, receiving and implementing an option for resolution of conflicting data types.

3. The method of claim 1, further comprising:
    handling one or more objects dependent on the database table unbeknownst to a user of the database table wherein modifying the schema of the database table comprises modifying the schema of the database table while the objects dependent on the database table remain visible to the user.

4. The method of claim 3, wherein handling the objects dependent on the database table comprises:
    examining a database for one or more objects utilizing the database table;
    determining an object type and a view of each object utilizing the database table;
    tracking a primary key identifier for a row in which a new field is created; and
    handling each object utilizing the database table based on the object type and the view;
    wherein the object type includes at least one of the following:
        another table having a lookup query to the database table;
        a query;
        a form having a record source that depends on the database table; and
        a report; and
    wherein the view includes at least one of the following:
        a design view;
        a datasheet view;
        a form view;
        a report view;
        a print preview view; and
        a chart or pivot view.

5. The method of claim 4, wherein handling each object based on the object type and the view, comprises at least one of the following:
    saving any edit in progress and after modifying the schema returning to a focus state rendered prior to modifying the schema when the view comprises the datasheet view and the object type comprises a table, a query, or a form or when the view comprises the form view and the object type comprises the form;
    returning after modifying the schema to a page rendered just before modifying the schema when the view comprises the print preview view and the object type comprises the table, the query, the report or the form;

returning after modifying the schema to the focus state rendered just before modifying the schema when the view comprises the chart view or the pivot view and the object type comprises the table, the query, or the form;

closing a saved browse state rendered prior to modifying the schema when the view comprises the datasheet view and the object type comprises the report or the form; and returning after modifying the schema to the focus state rendered just before modifying the schema when the view comprises the report view and the object type comprises the report;

wherein tracking the primary key identifier for the row in which the new field is created locates the focus state rendered just before modifying the schema.

6. A computer-readable storage medium comprising computer-executable instructions which, when executed by a computer, cause the computer to perform a method of modifying a table definition of a database table within a database application, the method comprising:

providing a user interface for creating a new field in the database table;

receiving a paste command in a database table column and pasting tabular data in a plurality of cells in the database table to insert multiple new fields in the database table column via the user interface while rendering the database table;

modifying a schema of the database table to include each new field of the inserted multiple new fields and the tabular data; and interpreting a data type of the tabular data that is pasted in the database table column to insert the multiple new fields, wherein interpreting a data type of the tabular data comprises:

examining all of a plurality of data values in a range comprising the pasted tabular data, wherein a number of records comprising the pasted tabular data is higher than a predetermined threshold;

determining a data type from among a plurality of data types for each individual data value in the range comprising the pasted tabular data, wherein determining a data type comprises:

determining whether the pasted tabular data includes a currency;

in response to the pasted tabular data including the currency, determining whether a higher precision or the currency plus numbers are required;

in response to the higher precision or the currency plus numbers being required, setting the data type as a number data type;

in response to the higher precision or the currency plus numbers not being required, determining whether the pasted tabular data includes multiple currencies or a mixed data type;

in response to the pasted tabular data not including the multiple currencies or the mixed data type, setting the data type as a currency data type;

in response to the pasted tabular data including the multiple currencies or the mixed data type, determining whether any cell containing the pasted tabular data contains text that exceeds a threshold number of characters;

in response to the text exceeding the threshold number of characters, setting the data type as a memo data type;

in response to the text not exceeding the threshold number of characters, setting the data type as a text data type;

determining whether the pasted tabular data includes numbers;

in response to the pasted tabular data including numbers, setting the data type as a number data type;

determining whether the pasted tabular data includes at least one of a date or time;

in response to the pasted tabular data including at least one of a date or time, setting the data type as at least one of a date or time data type;

determining whether the pasted tabular data includes a hyperlink;

in response to the pasted tabular data including the hyperlink, setting the data type as a hyperlink data type;

determining whether the pasted tabular data includes Boolean values;

in response to the pasted tabular data including the Boolean values, setting the data type as a Boolean data type; and applying a broadest of the plurality of data types that can store all of the data values without at least one of loss of data, truncation of data, and loss of precision.

7. The computer-readable storage medium of claim 6, further comprising: receiving data in a cell of the column in the database table containing the new fields; and in response to the data in the cell not being of a same data type as interpreted for the column, display a dialog providing notice that the data in the cell is not of the same data type interpreted for the column the dialog including resolution options.

8. The computer-readable storage medium of claim 6, further comprising computer-readable:

handling one or more objects dependent on the database table unbeknownst to a user of the database table;

wherein modifying the schema comprises modifying the schema while the objects dependent on the database table remain visible to the user.

9. The computer-readable storage medium of claim 8, wherein handling the objects dependent on the database table comprises:

examining a database for one or more objects utilizing the database table;

determining an object type and a view of each object utilizing the database table;

tracking a primary key identifier for a row in which a new field is created; and handling each object utilizing the database table based on the object type and the view.

10. A computer-implemented system for modifying a table definition of a database table within a database application, the system comprising:

a computer that includes a processor;

means for providing a user interface for creating a new field in the database table, wherein the user interface is illustrated by a computer screen;

means for receiving a paste command in a database table column and pasting tabular data in a plurality of cells in the database table to insert multiple new fields in the database table column via the user interface while displaying the database table;

means for modifying a schema of the database table to include each new field of the inserted multiple new fields and the tabular data; and means for interpreting a data type of the tabular data that is pasted in the database table column to insert the multiple new fields, wherein interpreting a data type of the tabular data comprises:

means for examining all of a plurality of data values in a range comprising the pasted tabular data, wherein a number of records comprising the pasted tabular data is higher than a predetermined threshold;

means for determining a data type from among a plurality of data types for each individual data value in the range comprising the pasted tabular data, wherein determining a data type comprises:

means for determining whether the pasted tabular data includes a currency;

in response to the pasted tabular data including the currency, means for determining whether a higher precision or the currency plus numbers are required;

in response to the higher precision or the currency plus numbers being required, means for setting the data type as a number data type;

in response to the higher precision or the currency plus numbers not being required, means for determining whether the pasted tabular data includes multiple currencies or a mixed data type;

in response to the pasted tabular data not including the multiple currencies or the mixed data type means for setting the data type as a currency data type;

in response to the pasted tabular data including the multiple currencies or the mixed data type, means for determining whether any cell containing the pasted tabular data contains text that exceeds a threshold number of characters;

in response to the text exceeding the threshold number of characters, means for setting the data type as a memo data type;

in response to the text not exceeding the threshold number of characters, means for setting the data type as a text data type;

means for determining whether the pasted tabular data includes numbers;

in response to the pasted tabular data including numbers, means for setting the data type as a number data type;

means for determining whether the pasted tabular data includes at least one of a date or time;

in response to the pasted tabular data including at least one of a date or time, means for setting the data type as at least one of a date or time data type;

means for determining whether the pasted tabular data includes a hyperlink;

in response to the pasted tabular data including the hyperlink, means for setting the data type as a hyperlink data type;

means for determining whether the pasted tabular data includes Boolean values;

in response to the pasted tabular data including the Boolean values, means for setting the data type as a Boolean data type;

means for applying a broadest of the plurality of data types that can store all of the data values without at least one of loss of data, truncation of data, and loss of precision; and means for handling one or more objects dependent on the database table unbeknownst to a user of the database table, wherein the means for handling one or more objects dependent on the database table comprises means for tracking a primary key identifier for a row in which the new field in the database table is created, wherein the primary key identifier comprises an identifier for a hidden column in the database table;

wherein the means for modifying the schema comprises means for modifying the schema while the objects dependent on the database table remain visible to the user.

11. The method of claim 3, wherein tracking a primary key identifier for a row in which a new field is created comprises tracking an identifier for a hidden column in the database table.

12. The computer-readable storage medium of claim 9, wherein tracking a primary key identifier for a row in which a new field is created comprises tracking an identifier for a hidden column in the database table.

* * * * *